April 18, 1939.　　　G. H. McMULLEN　　　2,154,763
MECHANICAL MOVEMENT
Filed Oct. 18, 1937　　　2 Sheets-Sheet 1
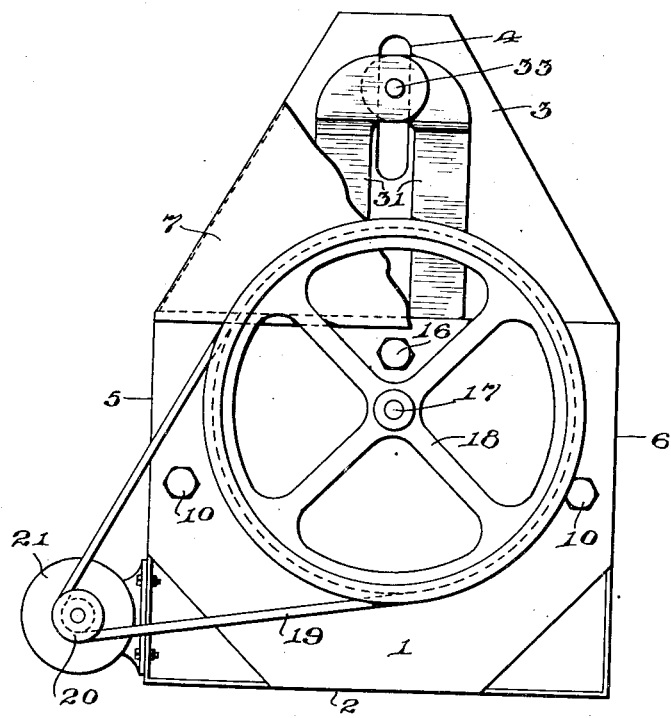
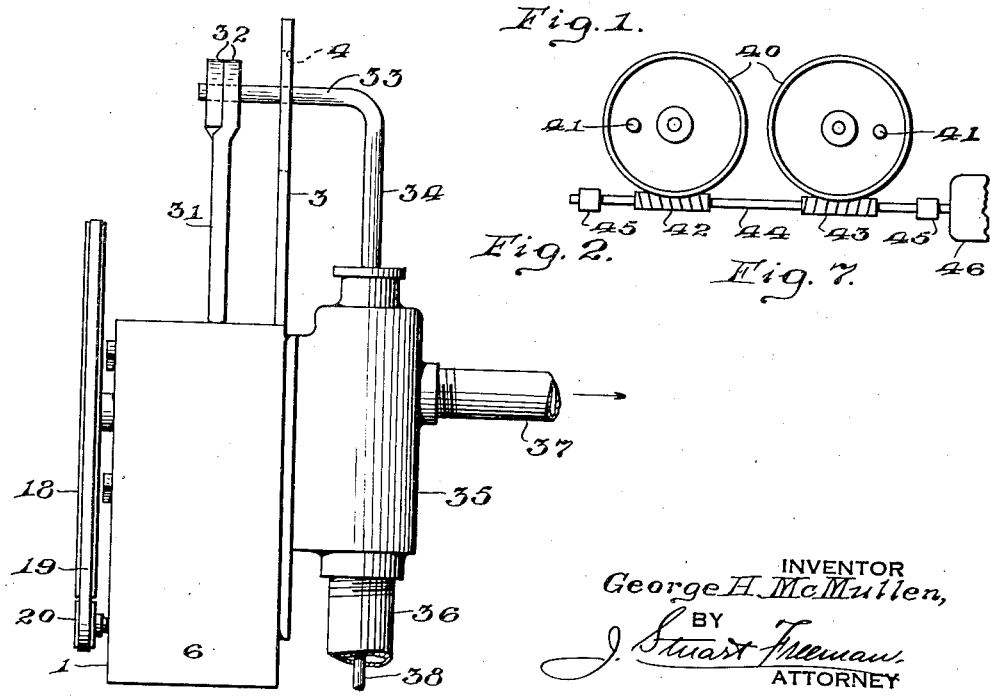
Fig. 1.　Fig. 2.　Fig. 7.
INVENTOR
George H. McMullen,
BY J. Stuart Freeman,
ATTORNEY April 18, 1939.    G. H. McMULLEN    2,154,763
MECHANICAL MOVEMENT
Filed Oct. 18, 1937    2 Sheets-Sheet 2

INVENTOR
George H. McMullen,
BY
J. Stuart Freeman,
ATTORNEY

Patented Apr. 18, 1939

2,154,763

UNITED STATES PATENT OFFICE 2,154,763

MECHANICAL MOVEMENT

George H. McMullen, West Chester, Pa.

Application October 18, 1937, Serial No. 169,671

9 Claims. (Cl. 74—45)

The object of the invention is to provide improvements in a type of mechanical movement, which is designed for and is especially efficient, when used in pump mechanisms such as those employed to raise water, oil and other liquids from wells, cisterns, storage tanks and the like.

It is quite obvious that in devices of this nature, more power has to be applied to raise the valve-actuating rod or plunger, in addition to the weight of the liquid being lifted, than has to be used when returning such rod or plunger to its lower position, after the liquid raised during the previous stroke has been dispensed from the device.

Therefore, another object is to provide a device of this character, in which the up-stroke is slower and the power applied at that time is proportionately greater, than that which is applied during a proportionately faster down-stroke, thereby concentrating the greatest power where and when it will do the greatest work, and at the same time providing for a relatively quick recovery or idling or down-stroke, during which no work is accomplished other than to hasten the otherwise slower descent of the plunger or rod to its lowermost position when under the influence of gravity only.

A further object is to provide in a device of this character a substantially symmetrical arrangement of gears and levers, which will operate to both equalize and at the same time minimize the resulting friction, while eliminating from the rod or plunger shaft all lateral wear, and stepping up so as to make available the effective power of but a small motor, so as to perform the work that is usually required of motors of considerably larger size, and at the same time to provide for substantially the entire operation of the device in a bath of oil or other suitable lubricant.

Figure 4:
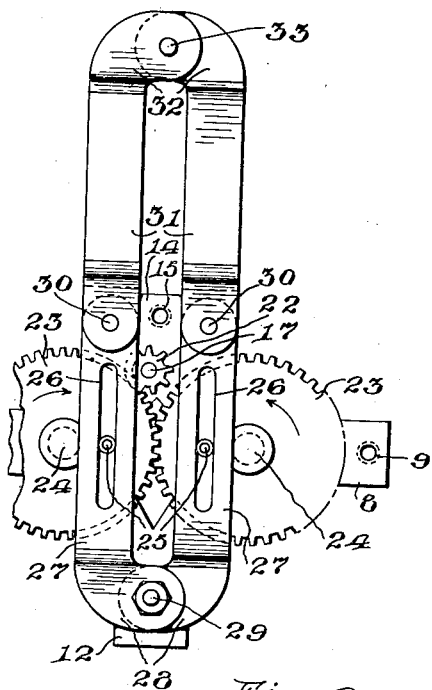
Figure 3:
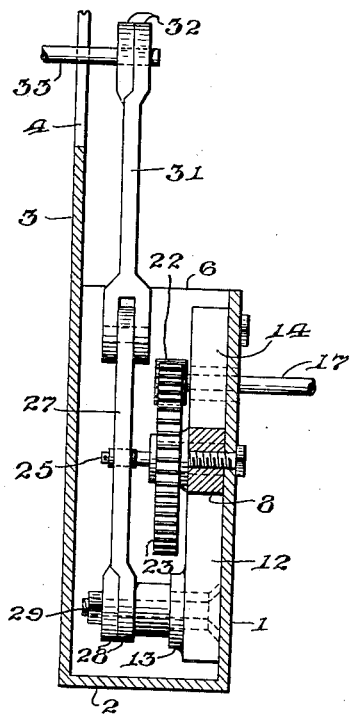
Figure 5:
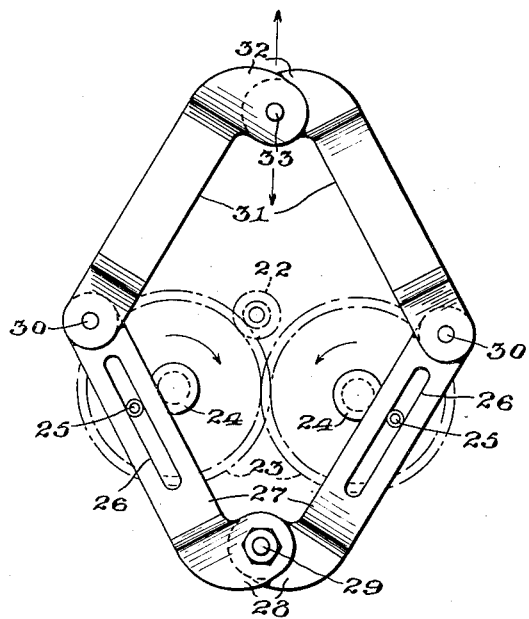
Figure 6:
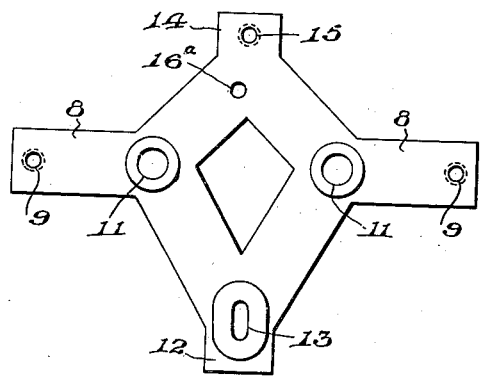

With the objects thus briefly stated, the invention comprises further details of construction and operation, which are hereinafter brought out in the following description when read in conjunction with the accompanying drawings, in which Fig. 1 is a front elevational view with a portion of the cover broken away; Fig. 2 is a side elevational view with the cover removed; Fig. 3 is a vertical sectional view showing the device in the position represented by Figs. 1 and 2, but with the motor, fly-wheel and connecting belt removed; Fig. 4 is a vertical fragmentary detail view of the internal mechanism of the device, as when the valve-actuating rod is in its uppermost position; Fig. 5 is a similar view of the valve-actuating links shown in Fig. 4, but in that position which corresponds with the lower-most position of the valve-actuating rod; Fig. 6 is a detail elevational view of the mechanism supporting frame; and Fig. 7 is a detail view of a modified form of driving mechanism.

Referring to the drawings, the improved device comprises a casing which may be formed of cast metal or sheet metal, welded so as to retain lubricants under all ordinary operating conditions, said casing comprising a forward wall 1, a bottom wall 2, a rear wall 3 which extends upwardly beyond the corresponding limit of said forward wall, and is provided with a similarly positioned upwardly extending elongated slot 4; said front and rear walls being also connected together by laterally positioned side walls 5 and 6. The upper portion of said rear wall preferably tapers upwardly and from it normally extends forwardly a suitable closure 7, which is adapted to prevent lubricants from splashing outwardly from within said casing, and at the same time prevent foreign matter from entering said casing and contaminating said lubricants and thereby injuring the mechanism.

Within said casing and secured to the front wall 1 is a supporting frame such as is shown in Fig. 6, said frame comprising laterally oppositely extending arms 8 provided with apertures 9, by which said arms are secured by means of bolts 10 to said forward casing wall, the inner portions of said arms being provided with enlarged circular bearings 11, while the lower-most portion 12 of said frame is provided with a vertically elongated bearing aperture 13. The uppermost portion 14 of said frame is also preferably provided with an aperture 15, by means of which the corresponding portion of said frame is secured by a bolt 16 to said front casing wall. Additionally, the upper portion of said frame slightly below said last-mentioned aperture and also slightly to one side of the medial line of said frame is provided with an aperture 16a, through which extends a driving shaft 17 upon the outer end of which is mounted the relatively large grooved pulley 18. Said pulley is connected by means of a suitable belt 19 to the relatively smaller pulley 20 of an electric motor 21, which is preferably mounted detachably upon one of the side walls of said casing.

The inner end of the shaft 17 carries a driving pinion 22, which meshes with one of a pair of inter-meshing gears 23, rotatably supported by trunnions 24 carried within the circular bearing apertures 11. Each of these inter-meshing gears is provided upon its inwardly directed face with a pin 25, preferably surrounded by suitable anti-friction means and extending into and movable longitudinally within elongated slots 26 in a pair of similar links 27. These links in their uppermost positions are preferably parallel, as indicated in Fig. 4, and are provided at their lower ends with angularly offset overlapping portions 28, which are connected together by means of a bolt 29, said bolt being normally fixedly positioned but adjustable vertically within the slot 13 of said frame member. The upper end of the links 27 is pivotally connected at 30 to the lower end of one of a pair of similarly upwardly extending links 31 which, in turn, at their uppermost ends are provided with overlapping angular offset portions 32, pivotally connected together by means of a pin 33, which reciprocates within the guide slot 4 in the rear wall of said casing, and is either connected to or forms an integral portion of a valve-actuating rod 34 which, in turn, enters any suitable type of valve 35, preferably mounted upon the outer surface of said rear casing wall and provided with inlet and outlet ports 36 and 37.

It is to be understood that for shallow well operation, the valve 35 is complete in itself, and that the actuating rod 34 terminates therein. However, in the case of deep well operation, said actuating rod passes through the valve 35 or is provided with a depending extension 38, which in well-known manner extends downwardly to and actuates an additional valve (not shown) located adjacent to the bottom of such deep well.

In the operation of this device rotation of the motor 21 rotates the driving pulley 18, which through the shaft 17 rotates the pinion 22, thereby rotating the inter-meshing gears 23 in synchronism in the directions indicated by the arrows shown in Fig. 4. The pins 25 carried by said gears thereupon effect an angularly oscillatory motion of the lower links 27, in regularly repeated cycles of operation between the extreme positions indicated in Figs. 4 and 5, respectively, thereby correspondingly oscillating the upper links 31 angularly and, as a result, raising and lowering the pin 33 so as to operate the reciprocatory valve hereinbefore referred to.

Of prime importance is the fact that, with an uninterrupted regular speed of rotation of the gears 23, the period of time between the uppermost position of the valve-actuating pin 33 and the lower-most position of said pin in that order is considerably less than the period between said lower-most position and said uppermost position, with the obvious result that said valve-actuating pin descends during its idle stroke much more rapidly than it ascends during its work stroke. Thus, the same power of the driving mechanism is applied during the work stroke over a longer period than during the idle stroke and, consequently, applies during the former a proportionately greater degree of power than during the latter, when less power is required, especially when it is realized that the valve-actuating rod will in any case tend to descend under the force of gravity, largely irrespective of the additional power applied to the same by the motor actuating mechanism.

It is, of course, to be borne in mind, that in addition to the anti-friction means surrounding the pins 25, suitable anti-friction means may also be provided in each location, where wear is caused by the frictional engagement of two or more parts, as for instance at the mounting of the shaft 17, the trunnions 24, the pivotal connections 29, 30 and 33 between said links, etc. It is also to be realized, that the device herein described is characterized by a degree of symmetry, such as will insure a substantial equalizing and minimizing of the wear, that to a certain degree is unavoidable.

As illustrative of the many modifications that may be made in the present device, reference is made to Fig. 7 in which two worm gears 40 (or members connected thereto), having link-engageable pins 41, are driven in opposite directions by means of right- and left-hand worms 42 and 43, upon a shaft 44 supported by bearings 45 and directly driven by a motor 46. In this manner a suitable gear reduction can be obtained, and at the same time elimination of the pulleys 18 and 20 and the belt 19.

In addition, it is to be understood that many alterations may obviously be made in the numerous details of construction herein set forth, and at the same time preserve the same or similar mode of operation, wherefore the appended claims are to be construed in their broadest aspect.

Having thus described my invention, what I claim as new and desire to protect by Letters Patent of the United States is:

1. In a pump-actuating mechanism, the combination of a reciprocatory valve rod, a laterally contractable diamond-shaped assembly of four pivotally connected links, one of the longitudinally positioned pivotal connections being also connected to said rod and the longitudinally opposite pivotal connection being normally fixedly positioned, two of said links being provided with guideways, and a pair of intermeshing gears having studs slidably engageable with said guideways, whereby continuous rotation of said gears in opposite directions effects an alternate contraction and lateral expansion of said diamond-shaped assembly with corresponding raising and lowering of said rod.

2. In a pump-actuating mechanism, the combination of a reciprocatory valve rod, a laterally contractable diamond-shaped assembly of four pivotally connected links, one of the longitudinally positioned pivotal connections being also connected to said rod and the longitudinally opposite pivotal connection being normally fixedly positioned, two of said links being provided with guideways, a pair of intermeshing gears having studs slidably engageable with said guideways, whereby continuous rotation of said gears in opposite directions effects an alternate contraction and lateral expansion of said diamond-shaped assembly with corresponding raising and lowering of said rod, a pinion meshing with one of said gears, and means to drive said pinion.

3. In a pump-actuating mechanism, the combination of a reciprocatory valve rod, a laterally contractable diamond-shaped assembly of four pivotally connected links, one of the longitudinally positioned pivotal connections being also connected to said rod and the longitudinally opposite pivotal connection being normally fixedly positioned, two of said links being provided with guideways, a pair of intermeshing gears having studs slidably engageable with said guideways, whereby continuous rotation of said gears in opposite directions effects an alternate contraction and lateral expansion of said diamond-shaped assembly with corresponding raising and lowering of said rod, a pinion meshing with one of said gears, means to drive said pinion, and a housing adapted to contain and supply lubricant to the relatively movable parts of said mechanism.

4. In a pump-actuating mechanism, the combination of a reciprocatory valve rod, a laterally contractable diamond-shaped assembly of four pivotally connected links, one of the vertically arranged pivotal connections thereof also being connected to said rod, while the longitudinally opposite pivotal connection is adjustably but normally fixedly positioned, two of said links being provided with guides, and a pair of intermeshing gears rotatable continuously at constant speed and having studs slidably engaging said guides, the direction of rotation of said gears being such that the contraction of said link assembly and the raising of said rod is appreciably slower than the expansion of said assembly and the lowering of said rod.

5. In a pump-actuating mechanism, the combination of a reciprocatory valve rod, a laterally contractable diamond-shaped assembly of four pivotally connected links, one of the vertically arranged pivotal connections thereof also being connected to said rod, while the longitudinally opposite pivotal connection is adjustably but normally fixedly positioned, two of said links being provided with guides, and a pair of intermeshing gears rotatable continuously at constant speed and having studs slidably engaging said guides, the direction of rotation of said gears being such that the contraction of said link assembly and the raising of said rod is appreciably slower than the expansion of said assembly and the lowering of said rod, a pinion meshing with one of said gears, and a power-reduction drive for said pinion.

6. In a pump-actuating mechanism, the combination of a reciprocatory valve rod, a laterally contractable diamond-shaped assembly of four pivotally connected links symmetrically arranged upon a vertical axis, the uppermost and lowermost pivotally connected portions of said links being angularly offset with respect to the axes of the respective links, to increase the effective elongation of said assembly with a given lateral expansion thereof, one of the vertically arranged pivotal connections thereof also being connected to said rod while the longitudinally opposite pivotal connection is adjustably but normally fixedly positioned, a plurality of opposed links being provided with guides, and a pair of intermeshing gears rotatable continuously at constant speed and having studs slidably engaging said guides, the direction of rotation of said gears being such that the contraction of the link assembly and the raising of said rod is appreciably slower than the expansion of said assembly and the lowering of said rod.

7. In a pump-actuating mechanism, a reciprocatory pump rod, a supporting frame comprising a central body portion having two laterally positioned bearings and a central lower bearing, a pair of intermeshing gears rotatable continuously at constant speed and supported by said first bearings, a pair of links having guides and having their lower ends pivotally connected together and to said lower bearing, studs carried by said gears and slidably engageable with said guides, a second pair of links pivotally connected together and having their opposite ends pivotally connected to the opposite ends of said first links and to said rod, the links of said pairs together forming a diamond-shaped assembly, whereby rotation of said gears in one direction operates to alternately collapse said assembly and raise said rod, and expand said assembly and lower said rod.

8. In a pump-actuating mechanism, a reciprocatory pump rod, a supporting frame comprising a central body portion having two laterally positioned bearings and a central lower adjustable bearing, a pair of intermeshing gears rotatable continuously at constant speed and supported by said first bearings, a pair of links having guides and having their lower ends pivotally connected together and to said lower bearing, studs carried by said gears and slidably engageable with said guides, a second pair of links pivotally connected together and having their opposite ends pivotally connected to the opposite ends of said first links and to said rod, the links of said pairs together forming a diamond-shaped assembly, whereby rotation of said gears in one direction operates to alternately collapse said assembly and raise said rod, and expand said assembly and lower said rod, and the vertical adjustment of said lower bearing being operative to vary the amplitude of reciprocation of said rod, and the differential between the speeds at which said rod is raised and lowered.

9. In a pump mechanism, the combination of a reciprocatory valve rod, a laterally contractable diamond-shaped assembly of four pivotally connected links, one of the pivotal connections of which is also connected to said rod, while the diametrically opposite pivotal connection is normally fixedly positioned, two of said links being provided with guideways, a pair of constant speed oppositely rotatable gears, means slidably connnecting a part of each of said gears to the guideways of said links, and a driving shaft operatively connected to said gears, whereby rotation of said gears effects an alternate contraction and expansion of said diamond-shaped assembly with a corresponding reciprocation of said rod at different speeds in its respective opposite directions of movement.

GEORGE H. McMULLEN.